May 8, 1923.
C. G. OLSON
HOB
Filed Oct. 27, 1920  2 Sheets-Sheet 1
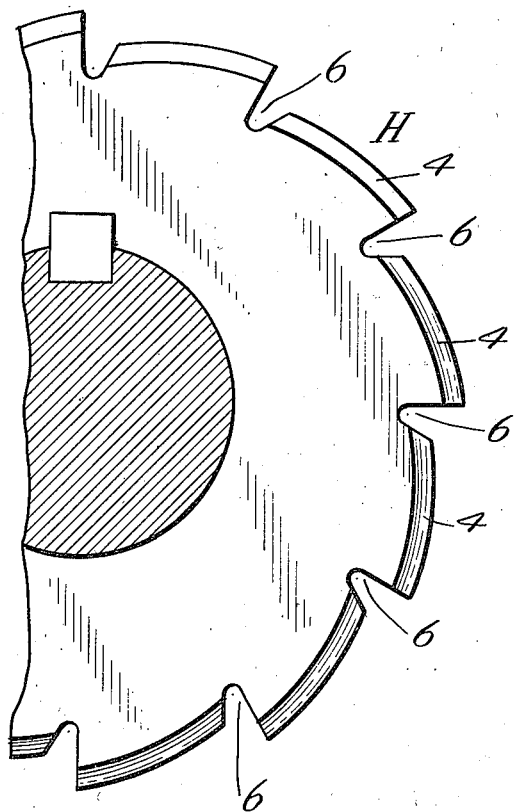
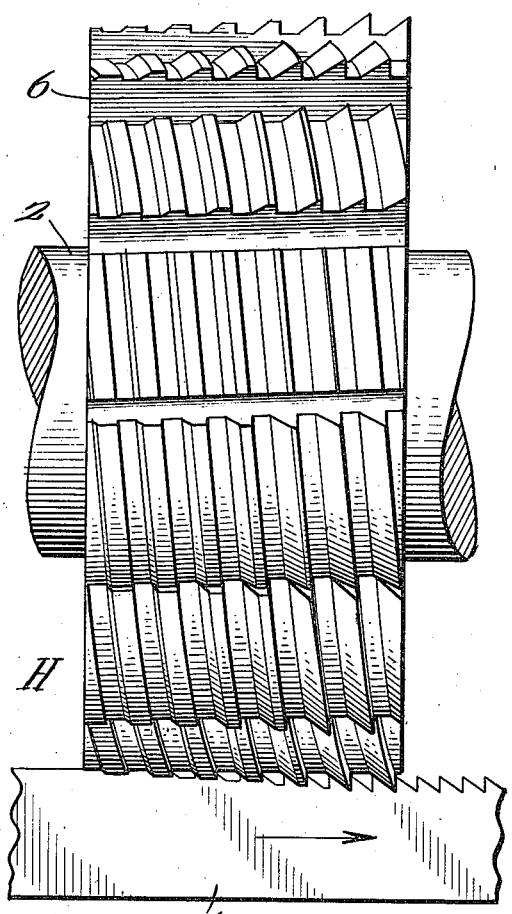
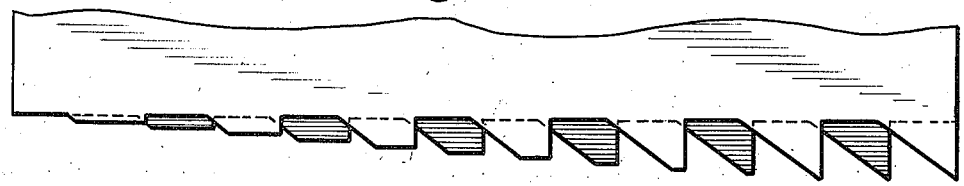
Inventor:
Carl G. Olson
By Cheever & Cox
Attys.

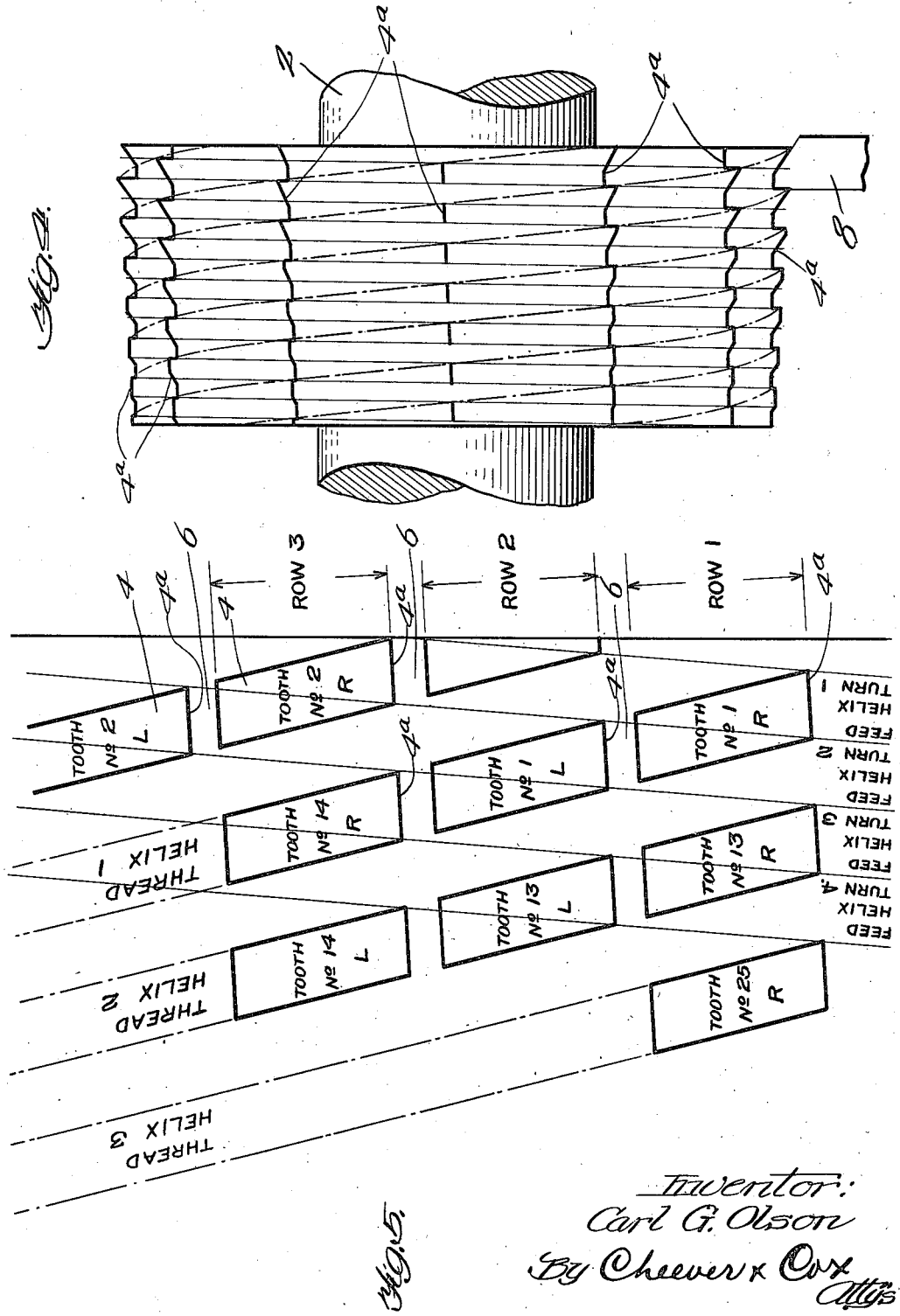

Patented May 8, 1923.

1,454,135

UNITED STATES PATENT OFFICE.

CARL G. OLSON, OF CHICAGO, ILLINOIS, ASSIGNOR TO ILLINOIS TOOL WORKS, OF CHICAGO, ILLINOIS, A CORPORATION OF ILLINOIS.

HOB.

Application filed October 27, 1920. Serial No. 419,823.

*To all whom it may concern:*

Be it known that I, CARL G. OLSON, a citizen of the United States, residing at Chicago, in the county of Cook and State of Illinois, have invented a certain new and useful Improvement in Hobs, of which the following is a specification.

My invention relates to hobs, and one of the objects is to produce a hob adapted for cutting teeth in such articles as saw blades and straight ratchets in which it is customary to make one side of the tooth perpendicular, that is, at right angles to the length of the saw or ratchet. Another object is to provide a hob which will produce such articles continuously, for any desired length, thereby enabling my device to produce band saws and similar articles which may be many feet in length. Still another object is to produce a hob of this character in which the teeth are staggered so they will cut first one side of a given tooth in the work and then the other, alternately. This produces teeth having sharper points than if both sides were cut at the same time. Another object is to produce such a staggered tooth hob by means of a single pointed turning tool in one kind of operation. Ordinarily, in producing milling cutters in which the teeth are staggered, the staggered effect is produced by first forming a complete set of teeth and then removing alternate teeth. This calls for a second kind of operation which as the result of my invention is eliminated. According to my process the staggered relation may be obtained by the use of a single point turning tool in a single kind of operation although, of course, a multiple pointed turning tool may be employed and produce the same result. It is preferable, however, in the case of a short hob, as illustrated, to use a single pointed turning tool as more accurate results may be obtained.

In my earlier Patent No. 1,425,893 issued August 15, 1922, I have shown a device in which the bodies of the teeth conform to thread helices, as in the present case, but the cutting faces occur or fall in rings parallel to the plane of rotation. Consequently that device constitutes a "milling cutter" in the sense that in operation there is no relative travel between the cutter and the work in a direction parallel to the axis of the cutter. In other words, there is no axial feed. In the present case, the device is a "hob" in distinction to a milling cutter and the work does travel. The direction of travel is, however, opposite (or preferably opposite) to the lead of the helices to which the hob teeth conform. The bodies of the teeth conform to helices but the cutting faces occur or fall in a feed helix which leads in the opposite direction to the thread or body helices. By thus having the feed helix lead in the opposite direction, the helix angle of the thread helices is reduced; but this could be reversed and the feed helix could be of the same "hand" as the thread helices although in such case the feed helix angle would necessarily be smaller than the angle of the thread helices. It is preferable, however, to have the two lead in opposite directions, as illustrated, for to form the feed helix in the same hand as the thread helices, would increase, usually excessively, the helix angle of the thread helices. By having the thread helices at a different angle from the feed helices sufficient side clearance is obtained to make it practical to produce teeth in the work in which one side is perpendicular to the length of the work as in the case of hacksaws and straight ratchets.

I accomplish my objects in the manner illustrated in the accompanying drawings in which—

Figure 1 is an end view of a portion of a hob involving my invention.

Figure 2 is a side or face view of the hob showing the work in the act of being cut.

Figure 3 is a fragmentary composite view illustrating the fact that the cuts gradually become deeper and deeper at any one point along the work, as the work advances, and also illustrating the fact that as usual in the production of hack saws, the same cutter or hob tooth does not take a cut in the same saw tooth each time, but alternately, so that any given saw tooth is cut first on one side and then on the other, a method which produces a better piece of work.

Figure 4 is in a certain sense diagrammatic, in that the gashes are omitted, thus visibly indicating in a plainer manner, the multithread helical formation of the teeth and also the fact that the cutting faces occur in a (preferably single) feed helix, the lead whereof is in the opposite direction.

Figure 5 is an exaggerated diagrammatic view showing the development of a portion of a hob embodying the invention.

Like numerals denote like parts throughout the several views.

In the drawing a saw blank 1 is shown in Figure 2 in the process of being cut. The hob indicated in general by the reference letter C is mounted upon a mandrel 2 in the usual manner. The teeth 4 of the cutter are relieved in the usual manner by gashes 6 as shown in Figure 1 and elsewhere. The cutting faces 4ª have a profile illustrated by the tool 8 shown in Figure 4.

In the form illustrated there are six different thread helices and the feed helix is single. In the diagram Figure 5, I have numbered the different turns of the feed helix 1, 2, 3 et seq., and the thread helices are numbered helix 1, helix 2, et seq. The rows of teeth between gashes are numbered row 1, row 2, and row 3 et seq. The hob is designed to cut first one side and then the other side of the tooth. I have marked the cutter tooth R to indicate teeth which will cut the right side of a saw tooth, and L to indicate those which will cut the left side of the saw tooth. It will be noted by inspecting the diagram that the cutting edges of tooth No. 1 R, No. 2 R, etc., occur in turn No. 1 of the feed helix while those of tooth No. 1 L and No. 2 L occur in turn No. 2 of the feed helix. Similarly the cutting faces of teeth No. 13 R and 14 R occur in turn No. 3 of the feed helix and teeth No. 13 L and 14 L occur in turn No. 4. This diagram assumes that there are 12 teeth in a circumference or single turn of the hob and tooth No. 13 of course will represent the first tooth after the first rotation and tooth No. 25 will represent the first one after the second rotation. In the diagram I have numbered the thread helices as thread helix No. 1, thread helix No. 2 et seq. It is quite common to design hack saws for example with 12 teeth to the inch and the present drawings are made to conform to that practice. I have also illustrated a case in which the hob will have six separate thread helices or "starts" although this may be varied. The pitch angle of the thread helices will be great enough, however, to bring successive teeth into adjacent turns of the feed helix.

As in the case of taps and threading dyes, my hob is tapered. Referring to Figures 2 and 4, it will be noted that the teeth are shorter at the left than at the right end of the hob, the result being that the cuts are progressively tapered as indicated in Figures 2 and 3. Furthermore, the hob teeth cut alternately first one side of the saw tooth and then the other so that every two successive teeth in the hob will cut both sides of any given tooth in the saw blank. The composite or aggregate effect is indicated by the alternately shaded and unshaded teeth in Figure 3.

In operation the saw blank is fed axially toward the right, Figure 2, as indicated, and whereas the cuts are shallow at first, they will increase in depth until as the blank leaves the cutter the teeth will have been fully formed.

It will be seen that as the result of my invention the hob may be formed by a turning tool in an ordinary relieving machine, that is, a relieving machine in which there is relative travel between the work and the turning tool in a direction parallel to the axis of the work. The result is that it is a relatively simple matter to keep the hob teeth in proper condition for the teeth will be true so long as the turning tool is kept true (other things being equal) and it is, of course, a comparatively simple thing to provide a turning tool having a proper profile.

Having thus described my invention what I claim as new and desire to secure by Letters Patent, is:

1. A device of the class described having relieved cutting teeth the bodies whereof conform to a helix leading in one direction and the cutting faces whereof occur in a feed helix leading in the opposite direction.

2. A device of the class described having relieved cutting teeth the bodies whereof conform to a helix leading in one direction and the cutting faces whereof occur in a feed helix leading in the opposite direction, the teeth being staggered whereby one tooth cuts one side of any given tooth in the work, and the next one cuts the other side of it.

3. A hob having relieved cutting teeth the bodies whereof conform to a thread helix and the cutting faces whereof occur in a feed helix which is at a different angle from that of the thread helix.

In witness whereof, I have hereunto subscribed my name.

CARL G. OLSON.